(12) United States Patent
Li

(10) Patent No.: US 10,353,257 B2
(45) Date of Patent: Jul. 16, 2019

(54) DISPLAY PANEL AND DISPLAY APPARATUS

(71) Applicants: HKC Corporation Limited, Shenzhen (CN); Chongqing HKC Optoelectronics Technology Co., ltd., Chongqing (CN)

(72) Inventor: Zeyao Li, Chongqing (CN)

(73) Assignees: HKC CORPORATION LIMITED, Shenzhen (CN); CHONGQING HKC OPTOELECTRONICS TECHNOLOGY CO., LTD., Chongqing (CN)

(*) Notice: Subject to any disclaimer, the term of this patent is extended or adjusted under 35 U.S.C. 154(b) by 0 days.

(21) Appl. No.: 15/848,579

(22) Filed: Dec. 20, 2017

(65) Prior Publication Data

US 2018/0292721 A1    Oct. 11, 2018

Related U.S. Application Data

(63) Continuation of application No. PCT/CN2017/083795, filed on May 10, 2017.

(30) Foreign Application Priority Data

Apr. 11, 2017  (CN) .......................... 2017 1 0233380

(51) Int. Cl.
| | |
|---|---|
| G09G 3/36 | (2006.01) |
| G02F 1/1362 | (2006.01) |
| G02F 1/1343 | (2006.01) |
| G02F 1/133 | (2006.01) |
| G02F 1/1368 | (2006.01) |

(52) U.S. Cl.
CPC .... G02F 1/136213 (2013.01); G02F 1/13306 (2013.01); G02F 1/134309 (2013.01); G02F 1/134336 (2013.01); G02F 1/136286 (2013.01); G09G 3/3648 (2013.01); G02F 1/1368 (2013.01); G02F 2001/134345 (2013.01); G02F 2201/123 (2013.01); G09G 2300/0426 (2013.01); G09G 2300/0439 (2013.01); G09G 2300/0842 (2013.01); G09G 2320/0233 (2013.01); G09G 2330/021 (2013.01)

(58) Field of Classification Search
CPC ....................... G02F 1/13306; G02F 1/136213
USPC ...................................... 345/87–88
See application file for complete search history.

(56) References Cited

U.S. PATENT DOCUMENTS

2006/0231838 A1* 10/2006 Kim ................. G02F 1/136213
                                                    257/59
2016/0180964 A1*  6/2016 Hu ......................... G11C 19/28
                                                    345/100

* cited by examiner

*Primary Examiner* — Roy P Rabindranath
(74) *Attorney, Agent, or Firm* — WPAT, PC

(57) ABSTRACT

A display panel is provided and includes: a substrate; multiple data lines arranged along a first direction of the substrate; multiple scan lines arranged along a second direction of the substrate; and multiple pixel units. Each pixel unit includes a first pixel and a second pixel. The first pixel and the second pixel are coupled to a same one of the data lines, and further are respectively coupled to adjacent two of the scan lines. A driving timing of the first pixel is ahead of that of the second pixel. The first pixel includes a first capacitor, the second pixel includes a second capacitor, and the first capacitor is smaller than the second capacitor.

14 Claims, 5 Drawing Sheets

DISPLAY PANEL AND DISPLAY APPARATUS

FIELD OF THE DISCLOSURE

The disclosure relates to the field of display technology, and more particularly to a display panel and a display apparatus.

BACKGROUND

Displays are widely applied due to numerous advantages such as thin bodies, energy saving, radiation-free, etc. Most of displays available on the market are backlight-type displays, and such display includes a display panel and a backlight module. The working principle of the display panel is placing liquid crystal molecules between two parallel substrates and applying a driving voltage on the two substrates to control rotation directions of the liquid crystal molecules, for refracting rays from the backlight module to generate images.

A thin film transistor-liquid crystal display (TFT-LCD) gradually occupies the dominant position in the display realm at present because of its properties such as low energy consumption, superior image quality and relatively high production yield, etc. Identically, the TFT-LCD includes a display panel and a backlight module. The display panel includes a color filter (CF) substrate and a thin film transistor (TFT) array substrate. The opposite internal sides of the substrates have transparent electrodes. A layer of liquid crystal (LC) molecules is interposed between the two substrates. The display panel controls the orientation of liquid crystal molecule by an electric field, changes the polarization state of light and realizes transmitting and blocking of optical path by polarizing plates and thereby achieves the purpose of displaying.

At present, in order to reduce the power consumption of display, an alternating current (AC) driving mode adopted by many products is a column two-dot inversion. The column two-dot inversion is the synthesis of a column inversion and a dot inversion, because adjacent two pixels in a same column have the same polarity and the two pixels use the same design, so that the two pixels have same storage capacitors, which would cause the problem of horizontal bright and dark lines on the display.

SUMMARY

A technical problem to be solved by the disclosure is to provide a display panel capable of improving the problem of horizontal bright and dark lines caused by the column two-dot inversion.

Moreover, the disclosure further provides a display apparatus including the display panel.

An objective of the disclosure is achieved by following embodiments.

In particular, a display panel includes:

a substrate;

a plurality of data lines, arranged along a first direction of the substrate;

a plurality of scan lines, arranged along a second direction of the substrate;

a plurality of pixel units, each of the pixel units including a first pixel and a second pixel;

the first pixel and the second pixel being coupled to a same one of the data lines, and further are respectively coupled to adjacent two of the scan lines, a driving timing of the first pixel being ahead of that of the second pixel; the first pixel including a first capacitor, the second pixel including a second capacitor, and the first capacitor being smaller than the second capacitor.

In an embodiment, a charging rate of the first pixel and a charging rate of the second pixel are the same. Such that, by accurately computing and adjusting a difference between the first capacitor and the second capacitor of the first pixel and the second pixel respectively, it ensures the charging rates of the two pixels to be the same, the problem of horizontal bright and dark lines on the display caused by the column two-dot inversion can be effectively improved, an overall brightness of the display panel is more uniform, especially the low grayscale display is more clear and natural, uneven brightness of the display panel and Mura phenomenon caused by the uneven brightness can be better improved, display quality of the display panel is further increased, the display effect of the display panel is more clear and natural, better display effect of the display panel is ensured, and market competitiveness of the display panel is effectively enhanced.

In an embodiment, the first capacitor includes a first pixel capacitor and at least one first storage capacitor, the second capacitor includes a second pixel capacitor and at least one second storage capacitor, the first pixel capacitor and the second pixel capacitor are the same, the first storage capacitor is smaller than the second storage capacitor. Such that, by adjusting the first storage capacitor and the second storage capacitor, the first storage capacitor is made to be smaller than the second storage capacitor, it can ensure reducing a difference between charging rates of two pixels in the situation of different data signal delays, the problem of horizontal bright and dark lines is effectively improved, better display effect of the display panel is ensured and display quality of the display panel is further enhanced.

In an embodiment, the first pixel includes a first pixel electrode and a first storage electrode, the second pixel includes a second pixel electrode and a second storage electrode; the first storage capacitor is formed by the first storage electrode and the first pixel electrode matched with each other, the second storage capacitor is formed by the second storage electrode and the second pixel electrode matched with each other; an overlapped area of the first storage electrode with the first pixel electrode is smaller than an overlapped area of the second storage electrode with the second pixel electrode. Such that, a capacity of the second storage capacitor is larger than a capacity of the first storage capacitor, it can ensure reducing the difference between charging rates of two pixels in the situation of different data signal delays, the problem of horizontal bright and dark lines is effectively improved, good display effect of the display panel is ensured, display quality of the display panel is further increased, better display effect of the display panel is ensured, and market competitiveness of the display panel is effectively enhanced.

In an embodiment, a first domain line is disposed just above the first storage electrode, and the first pixel electrode includes at least one the first domain line; a second domain line is disposed just above the second storage electrode, and the second pixel electrode includes at least one the second domain line; an overlapped area of the first storage electrode with the first domain line is smaller than an overlapped area of the second storage electrode with the second domain line. Such that, on the prerequisite of without affecting the implementation of designed other manufacturing process, by suitably adjusting the overlapped area of the first storage electrode with the first domain line as well as the overlapped area of the second storage electrode with the second domain line, it is very convenient and simple to perform a differentiated improvement on the first storage capacitor and the second storage capacitor, so that a capacity of the second storage capacitor is larger than a capacity of the first storage capacitor, it can ensure reducing the difference between charging rates of two pixels in the situation of different data signal delays, the problem of horizontal bright and dark lines is effectively improved, better display effect of the display panel is ensured, and display quality of the display panel is further increased.

In an embodiment, the first pixel electrode is disposed with one first domain line, the second pixel electrode is disposed with one second domain line, a width of the first storage electrode is smaller than a width of the second storage electrode. Such that, by suitably adjusting the width of the first storage electrode and the width of the second storage electrode, it is very convenient and simple to perform a differentiated improvement on the first storage capacitor and the second storage capacitor, so that a capacity of the second storage capacitor is larger than a capacity of the first storage capacitor, it can ensure reducing the difference between charging rates of two pixels in the situation of different data signal delays, the problem of horizontal bright and dark lines is effectively improved, better display effect of the display panel is ensured, the display quality of the display panel is further increased, and market competitiveness of the display panel is better enhanced.

In an embodiment, the first pixel electrode is disposed with mutually perpendicular two first domain lines, and the two first domain lines are a first vertical domain line and a first transverse domain line. The second pixel electrode is disposed with mutually perpendicular two second domain lines, and the two second domain lines are a second vertical domain line and a second transverse domain line. Such that, because the first pixel electrode is disposed with mutually perpendicular two first domain lines, and the second pixel electrode is disposed with mutually perpendicular two second domain lines, it is very beneficial to perform a differentiated improvement on the first storage capacitor and the second storage capacitor.

In an embodiment, widths of the first domain line and the second domain lines each are in a range of 3~6 μm. Such that, because the first domain line and the second domain line each are made with a width in the range of 3~6 μm, it is beneficial to ensure the display effect of the display panel and can effectively reduce the sizes of dark regions presented by the first domain line and the second domain line when the display is working, the display panel can achieve better display quality, and market competitiveness of the display panel is further enhanced.

In an embodiment, widths of the first storage electrode and the second storage electrode each are in a range of 3~6 μm, the widths of the first storage electrode and the second storage electrode are smaller than or equal to widths of the first domain line and the second domain line respectively. Such that, when the display panel is working, liquid crystal orientations at locations of the first domain line and the second domain line are disordered, and thus the locations appear dark states; the first storage electrode and the second storage electrode are disposed just below the first domain line and the second domain line, it is not easy to affect the display effect of the display panel, the problem of horizontal bright and dark lines on the display caused by the column two-dot inversion can be effectively improved, uneven brightness of the display panel and the Mura phenomenon caused by the uneven brightness are effectively improved, and the display quality of the display panel is further increased.

According to another aspect of the instant application, the disclosure further provides a display apparatus. The display apparatus includes a backlight module and the display panel as described above.

In the disclosure, by performing a differentiated design on the first pixel and the second pixel of the pixel unit, i.e., the first pixel and the second pixel are designed with the first capacitor and the second capacitor with different sizes, on the prerequisite of without affecting other design, by suitably increasing the second capacitor of the second pixel, the difference between charging rates of two pixels can be reduced in the situation of different data signal delays, the problem of horizontal bright and dark lines on the display caused by the column two-dot inversion can be effectively improved, uneven brightness of the display panel and Mura phenomenon caused by the uneven brightness are effectively improved, the display quality of the display panel is further increased, the display effect of the display panel is more clear and natural, better display effect of the display panel is ensured, and market competitiveness of the display panel is effectively enhanced.

DETAILED DESCRIPTION OF EMBODIMENTS

Figure 1:
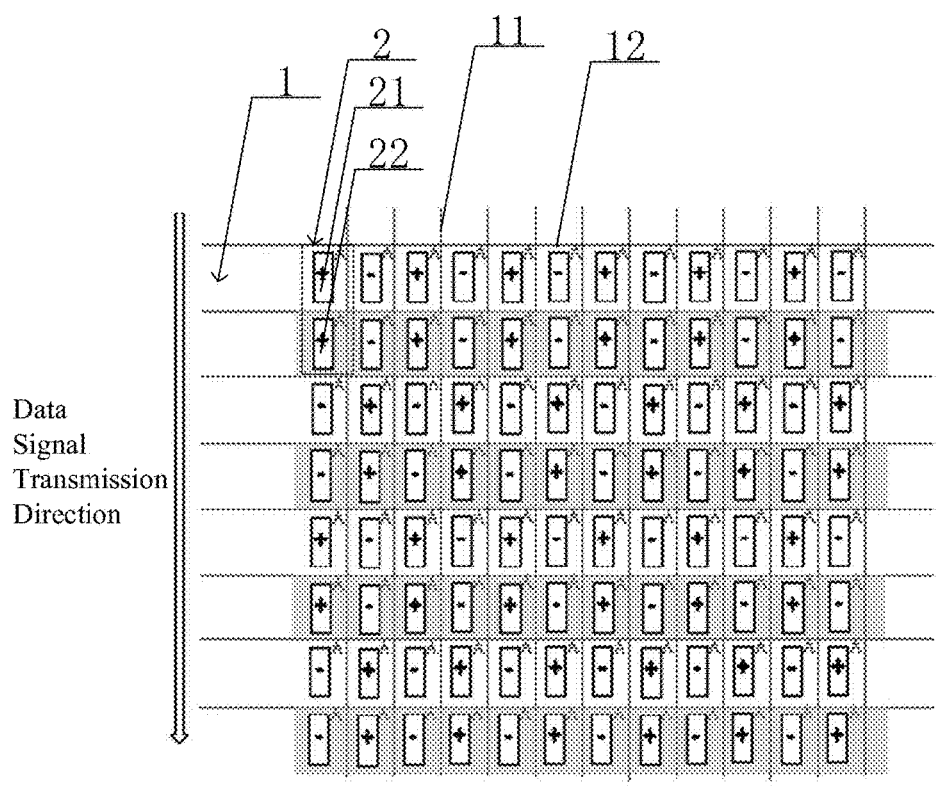
FIG. 1 is a schematic structural view of a display panel designed by an inventor(s) according to an embodiment of the disclosure.

The specific structural and functional details disclosed herein are only representative and are intended for describing exemplary embodiments of the disclosure. However, the disclosure can be embodied in many forms of substitution, and should not be interpreted as merely limited to the embodiments described herein.

In the description of the disclosure, terms such as "center", "transverse", "above", "below", "left", "right", "vertical", "horizontal", "top", "bottom", "inside", "outside", etc. for indicating orientations or positional relationships refer to orientations or positional relationships as shown in the drawings; the terms are for the purpose of illustrating the disclosure and simplifying the description rather than indicating or implying the device or element must have a certain orientation and be structured or operated by the certain orientation, and therefore cannot be regarded as limitation to the disclosure. Moreover, terms such as "first" and "second" are merely for the purpose of illustration and cannot be understood as indicating or implying the relative importance or implicitly indicating the number of the technical feature. Therefore, features defined by "first" and "second" can explicitly or implicitly include one or more the features. In the description of the disclosure, unless otherwise indicated, the meaning of "a plurality of" is two or more than two. In addition, the term "include" and any variations thereof are meant to cover a non-exclusive inclusion.

In the description of the disclosure, it should be noted that, unless otherwise clearly stated and limited, terms "mounted", "connected with" and "connected to" should be understood broadly, for instance, can be a fixed connection, a detachable connection or an integral connection; can be a mechanical connection, can also be an electrical connection; can be a direct connection, can also be an indirect connection by an intermediary, can be an internal communication of two elements. A person skilled in the art can understand concrete meanings of the terms in the disclosure as per specific circumstances.

The terms used herein are only for illustrating concrete embodiments rather than limiting the exemplary embodiments. Unless otherwise indicated in the content, singular forms "a" and "an" also include plural. Moreover, the terms "include" and/or "contain" define the existence of described features, integers, steps, operations, units and/or components, but do not exclude the existence or addition of one or more other features, integers, steps, operations, units, components and/or combinations thereof.

The disclosure will be further described below with reference to accompanying drawings and preferred embodiments.

Figure 2:
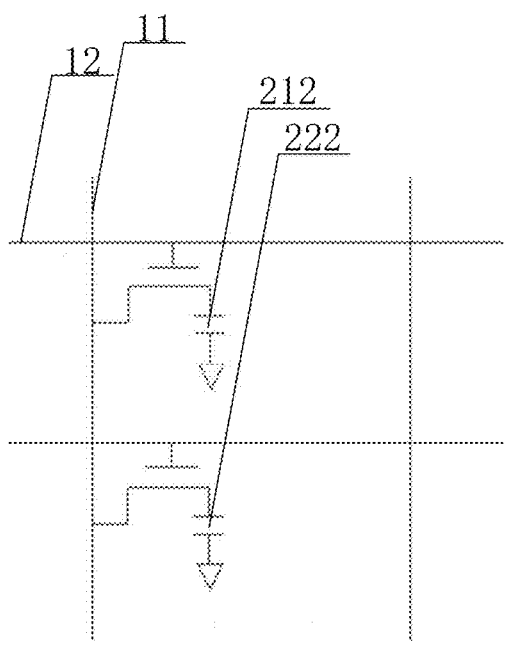
FIG. 2 a schematic circuit diagram a pixel unit designed by an inventor(s) according to an embodiment of the disclosure.

Referring to FIG. 1 and FIG. 2, a pixel array uses a column two-dot driving mode. A pixel unit 2 includes a first pixel 21 and a second pixel 22. The first pixel 21 and the second pixel 22 have a same polarity and are disposed in two adjacent rows. The first pixel 21 includes a first pixel capacitor 212, the second pixel 22 includes a second pixel capacitor, and the first pixel 21 and the second pixel 22 have a same design.

An alternating current (AC) driving mode as adopted is a column two-dot inversion, and the column two-dot inversion is the synthesis of a column inversion and a dot inversion, and the column two-dot inversion can very effectively reduce the power consumption of display. The first pixel 21 and the second pixel 22 have the same design, so that the first pixel capacitor 212 and the second pixel capacitor 222 are the same, which facilitates the manufacture of the pixel array and can effectively reduce the research and development cost.

The first pixel 21 and the second pixel 22 employ the same design, so that the first pixel capacitor 212 and the second pixel capacitor 222 are the same, which causes a charging rate of a succeeding pixel to be greater than that of a preceding pixel, and as a result, adjacent two pixels would have a brightness difference and the problem of horizontal bright and dark lines on the display would appear. Therefore, a display panel capable of effectively improving the problem of horizontal bright and dark lines caused by the column two-dot inversion is proposed.

Figure 3:
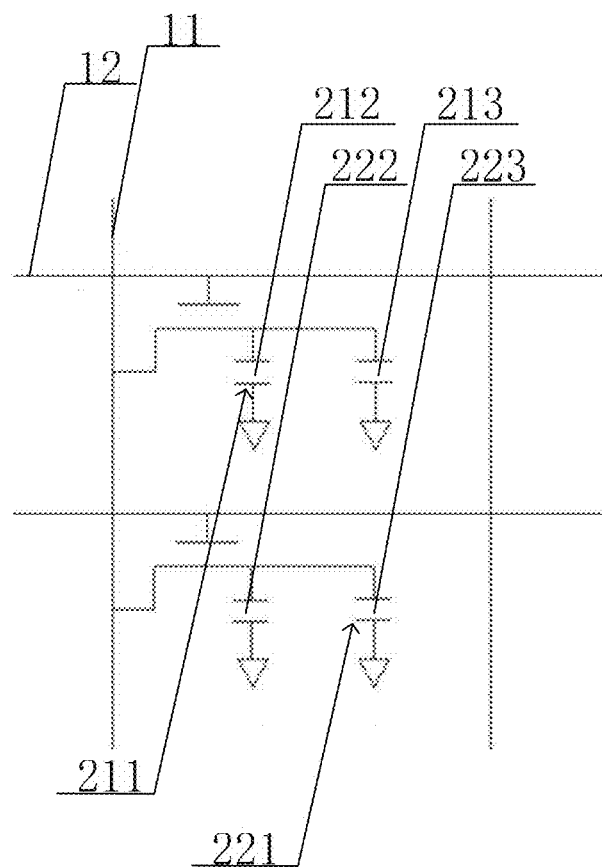
FIG. 3 is a schematic circuit diagram of a pixel unit according to an embodiment of the disclosure.

Referring to FIG. 3, the display panel includes:
a substrate 1;
a plurality of data lines 11, arranged along a first direction of the substrate 1;
a plurality of scan lines 12, arranged along a second direction of the substrate 1;
a plurality of pixel units 2, each pixel unit 2 including a first pixel 21 and a second pixel 22;
the first pixel 21 and the second pixel 22 being coupled to a same one of the data lines 11 and further respectively coupled to adjacent two of the scan lines 12, and a driving timing of the first pixel 21 being ahead of that of the second pixel 22;
the first pixel 21 including a first capacitor 211, the second pixel 22 including a second capacitor 221, and the first capacitor 211 being smaller than the second capacitor 221.

By a differentiated design applied to the first pixel 21 and the second pixel 22 of the pixel unit 2, i.e., the first pixel 21 and the second pixel 22 respectively are designed with the first capacitor 211 and the second capacitor 221 of different sizes, so that on the prerequisite of without affecting other designs, by suitably increasing the second capacitor 221 of the second pixel 22, it can reduce a difference between charging rates of two pixels in the situation of different data signal delays and effectively improve the problem of horizontal bright and dark lines on the display caused by the column two-dot inversion, uneven brightness of the display panel and Mura phenomenon caused by the uneven brightness are effectively improved, the display quality of the display panel is further improved, the display effect of the display panel is more clear and natural, a better display effect of the display panel is ensured, and the market competitiveness of the display panel is effectively enhanced.

The display panel uses the driving mode of column two-dot inversion, and the column two-dot inversion can very effectively reduce the power consumption of the display. The column two-dot inversion is the synthesis of a column inversion and a dot inversion and embodied as two pixels in each column being taken as a unit to reverse polarities of positive and negative and adjacent two rows of pixels using column as a unit to reverse polarities of positive and negative. As seen from driving waveforms, a data driver IC uses two addressing times (2Hsync cycles) as a unit to reverse a driving signal voltage, a waveform frequency is between that of the dot inversion and the column inversion, so that its power consumption is much lower than that of the dot inversion.

The charging rate of the first pixel 21 and the charging rate of the second pixel 22 are the same, by accurately computing and adjusting the difference between the first capacitor 211 and the second capacitor 221 of the first pixel 21 and the second pixel 22, it can better improve the problem of different charging rates of the first pixel 21 and the second pixel 22 caused by data signal delays, charging rates of the two pixels are ensured to be the same, the problem of horizontal bright and dark lines on the display caused by the column two-dot inversion can be effectively improved, an entire brightness of the display panel is more uniform, especially the low grayscale display is more clear and natural, uneven brightness of the display panel and Mura phenomenon caused by the uneven brightness are better improved, the display quality of the display panel is further improved, the display effect of the display panel is more clear and natural, a better display effect of the display panel is ensured and the market competitiveness of the display panel is effectively enhanced.

The first capacitor 211 includes a first pixel capacitor 212 and at least a first storage capacitor 213, the second capacitor 221 includes a second pixel capacitor 222 and at least a second storage capacitor 223, and the first pixel capacitor 212 and the second pixel capacitor 222 are the same. The first pixel capacitor and the second pixel capacitor are made to have the same design, which facilities the first pixel capacitor and the second pixel capacitor to be disposed, the manufacturing process of the first pixel capacitor 212 and the second pixel capacitor 222 is not needed to be changed, it is beneficial to increase the production efficiency of the display panel and does not need to change the original designs of the first pixel capacitor and the second pixel capacitor, the production cost is effectively saved, the research and development cost of the display panel is reduced, and thus the market competitiveness of the display panel is further enhanced. The first storage capacitor 213 is smaller than the second storage capacitor 223, by adjusting the first storage capacitor 213 and the second storage capacitor 223 to make the first storage capacitor 213 be smaller than the second storage capacitor 223, it can better ensure reducing the difference between charging rates of two pixels in the situation of different data signal delays, the problem of horizontal bright and dark lines is effectively improved, better display effect of the display panel is ensured and thus display quality of the display panel is increased. By accurately computing and adjusting a size difference between the first storage capacitor 213 and the second storage capacitor 223 of the first pixel 21 and the second pixel 22, the charging rates of the two pixels being the same is effectively ensured, the problem of horizontal bright and dark lines on the display caused by the column two-dot inversion can be very effectively improved, the overall brightness of display panel is more uniform, especially the low grayscale display is more clear and natural, uneven brightness of the display panel and Mura phenomenon caused by the uneven brightness are better improved, the display quality of the display panel is further improved, the display effect of display panel is more clear and natural, better display effect of the display panel is ensured and market competitiveness of the display panel is effectively enhanced. Meanwhile, the adjustment of the first storage capacitor 213 and the second storage capacitor 223 is relatively more simple and convenient, an accurate adjustment of the first storage capacitor 213 and the second storage capacitor 223 can be effectively made by a slight improvement to the existing manufacturing process, the sizes of the first storage capacitor 213 and the second storage capacitor 223 can be effectively controlled.

The first pixel 21 includes a first pixel electrode 214 and a storage electrode 215, and the second pixel 22 includes a second pixel electrode 224 and a second storage electrode 225. The first pixel electrode 214 and the second pixel electrode 224 have same shapes and sizes, by designing the first pixel electrode 214 and the second pixel electrode 224 to be completely the same, the first pixel electrode 214 and the second pixel electrode 224 can be very conveniently disposed, it is beneficial to increase production efficiency of the display panel and there is no need of changing the original design of the first pixel electrode 214 and the second pixel electrode 224, the production cost can be effectively saved, the research and development cost of the display panel is reduced, and the competitiveness of the display panel is further enhanced. The first storage capacitor 213 is formed by the first storage electrode 215 and the first pixel electrode 214 matched with each other, the first storage electrode 215 is disposed below the first pixel electrode 214, the overlapped area of the first storage electrode 215 with the first pixel electrode 214 forms the first storage capacitor 213, so that the manufacture of the first storage capacitor 213 is very convenient and simple, and the production efficiency of the display panel is further effectively increased. The second storage capacitor 223 is formed by matching the second storage electrode 225 with the second pixel electrode 224, the second storage electrode 225 is disposed below the second pixel electrode 224, the overlapped area of the second storage electrode 225 with the second pixel electrode 224 forms the second storage capacitor 223, so that the manufacture of the second storage capacitor 223 is very convenient and simple, and the production efficiency of the display panel is further effectively increased. The overlapped area of the first storage electrode 215 with the first pixel electrode 214 is smaller than the overlapped area of the second storage electrode 225 with the second pixel electrode 224, so that the capacity of the second storage capacitor 223 is larger than the capacity of the first storage capacitor 213, it can ensure reducing the difference between charging rates of two pixels in the situation of different data signal delays, the problem of horizontal bright and dark lines is effectively improved, better display effect of the display panel is ensured, and the display quality of the display panel is further increased. By accurately computing and adjusting the size difference between the first storage capacitor 213 and the second storage capacitor 223 of the first pixel 21 and the second pixel 22, the charging rates of the two pixels are effectively ensured to be the same, the problem of horizontal bright and dark lines on the display caused by the column two-dot inversion is very effectively improved, the overall brightness of the display panel is more uniform, especially the low grayscale display is more clear and natural, uneven brightness of the display panel and Mura phenomenon caused by the uneven brightness are better improved, the display quality of the display panel is further increased, the display effect of the display panel is more clear and natural, the display effect of the display panel is better ensured, and the market competitiveness of the display panel is effectively enhanced.

A first domain line 216 is disposed right above the first storage electrode 215, the first pixel electrode 214 includes at least one first domain line 216, and the first storage electrode 215 is disposed right below the first domain line 216, which would not affect the aperture ratio of the first pixel electrode 214 and is beneficial to ensure the display effect of the display panel, and meanwhile there is no need of changing other manufacturing steps of the display panel and thus it is beneficial to reduce the production cost of the display panel, the production efficiency of the display panel is effectively increased consequently. The second storage electrode 225 has a second domain line 226 disposed right thereabove, the second pixel electrode 224 includes at least one second domain line 226, and the second storage electrode 225 is disposed right below the second domain line 226, which would not affect the aperture ratio of the second pixel electrode 224 and is beneficial to ensure good display effect of the display panel, and meanwhile there is no need of changing other manufacturing steps of the display panel and thus it is beneficial to reduce the production cost of the display panel, the production efficiency of the display panel is effectively increased. Moreover, when the display panel is working, liquid crystal orientations at locations of the first domain line 216 and the second domain line 226 are disordered, and consequently the locations present/appear dark states. The first storage electrode 215 and the second storage electrode 225 respectively disposed right below the first domain line 216 and the second domain line 226 would not affect the display effect of the display panel, the display quality of the display panel is ensured consequently. The overlapped area of the first storage electrode 215 with the first domain line 216 is smaller than the overlapped area of the second storage electrode 225 with the second domain line 226, on the prerequisite of without affecting implementation of designed other manufacturing process, by suitably adjusting the overlapped area of the first storage electrode 215 with the first domain line 216 and the overlapped area of the second storage electrode 225 with the second domain line 226, it is very convenient and simple to realize a differentiated improvement applied to the first storage capacitor 213 and the second storage capacitor 223, the capacity of the second storage capacitor 223 is larger than the capacity of the first storage capacitor 213, it can better ensure reducing a difference between charging rates of two pixels in the situation of different data signal delays, the problem of horizontal bright and dark lines is effectively improved, better display effect of the display panel is ensured, and display quality of the display panel is further increased. By accurately computing and adjusting the overlapped area of the first storage electrode 215 with the first domain line 216 as well as the overlapped area of the second storage electrode 225 with the second domain line 226, the sizes of the first storage capacitor 213 and the second storage capacitor 223 can be accurately controlled, the charging rates of two pixels are effectively ensured to be completely the same, the problem of horizontal bright and dark lines on the display caused by the column two-dot inversion can be very effectively improved, the overall brightness of the display panel is more uniform, especially the low grayscale display is more clear and natural, uneven brightness of the display panel and Mura phenomenon caused by the uneven brightness are better improved, the display quality of the display panel is further increased, the display effect of the display panel is much more clear and natural, better display effect of the display panel is ensured and the market competitiveness of the display panel is effectively enhanced consequently.

Figure 4:
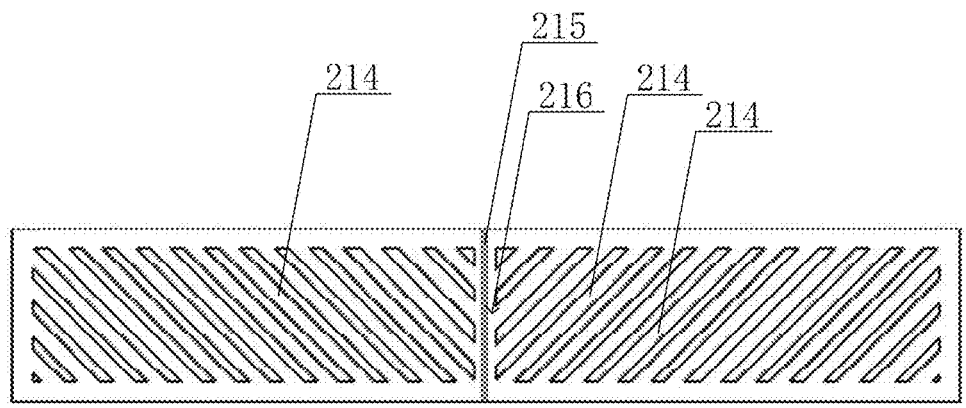
FIG. 4 is a schematic structural view of a first pixel electrode according to an embodiment of the disclosure.
Figure 5:
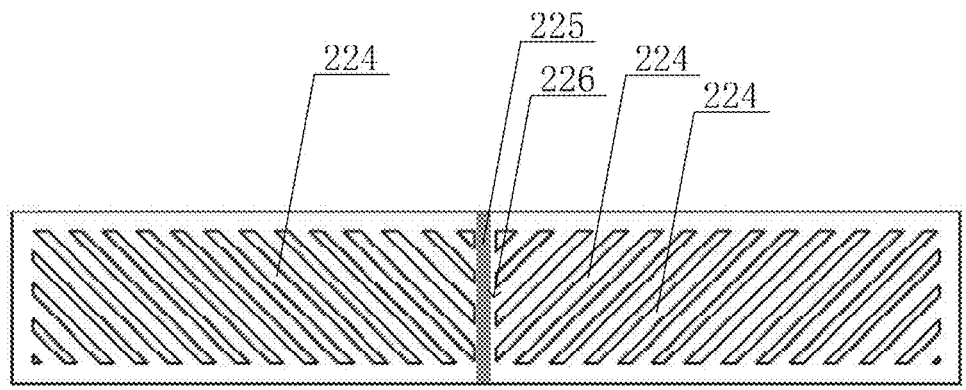
FIG. 5 is a schematic structural view of a second pixel electrode according to an embodiment of the disclosure.

Referring to FIG. 4 and FIG. 5, a first pixel electrode 214 is disposed with one first domain line 216, a second pixel electrode 224 is disposed with one second domain line 226, a width of a first storage electrode 215 is smaller than a width of a second storage electrode 225, a length of the first storage electrode 215 is greater than a length of the first domain line 216, and a length of the second storage electrode 225 is greater than a length of the second domain line 226. On the prerequisite of without affecting implementation of designed other manufacturing process, by suitably adjusting the width of the first storage electrode 215 and the width of the second storage electrode 225, it is very convenient and simple to carry out a differentiated improvement applied to the first storage capacitor 213 and the second storage capacitor 223, so that the capacity of the second storage capacitor 223 is greater than the capacity of the first storage capacitor 213, it can ensure a difference between charging rates of two pixels in the situation of different data signal delays, the problem of horizontal bright and dark lines is effectively improved, better display effect of the display panel is ensured, the display quality of the display panel is further increased, and market competitiveness of the display panel is better enhanced.

The first pixel electrode 214 is disposed with mutually perpendicular two first domain lines 216, and the two first domain lines 216 are a first vertical domain line 217 and a first transverse domain line 218. The second pixel electrode 224 is disposed with mutually perpendicular two second domain lines 226, and the two second domain lines 226 are a second vertical domain line 227 and a second transverse domain line 228. Since the first domain lines 216 disposed on the first pixel electrode 214 are two perpendicular with each other, and the second domain lines 226 disposed on the second pixel electrode 224 are two perpendicular with each other, it is very beneficial to perform a differentiated improvement onto the first storage capacitor 213 and the second storage capacitor 223, on the prerequisite of without affecting implementation of designed other manufacturing process, it is very convenient and simple to realize the design purpose of forming different first storage capacitor 213 and second storage capacitor 223, a difference between charging rates of two pixels is consequently reduced in the situation of different data signal delays.

Figure 6:
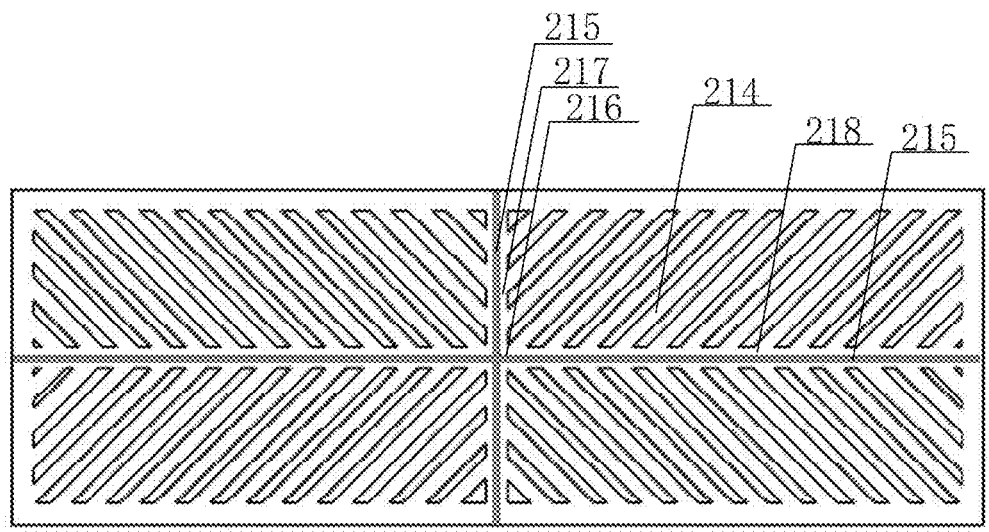
FIG. 6 is a schematic structural view of a first pixel electrode according to another embodiment of the disclosure.
Figure 7:
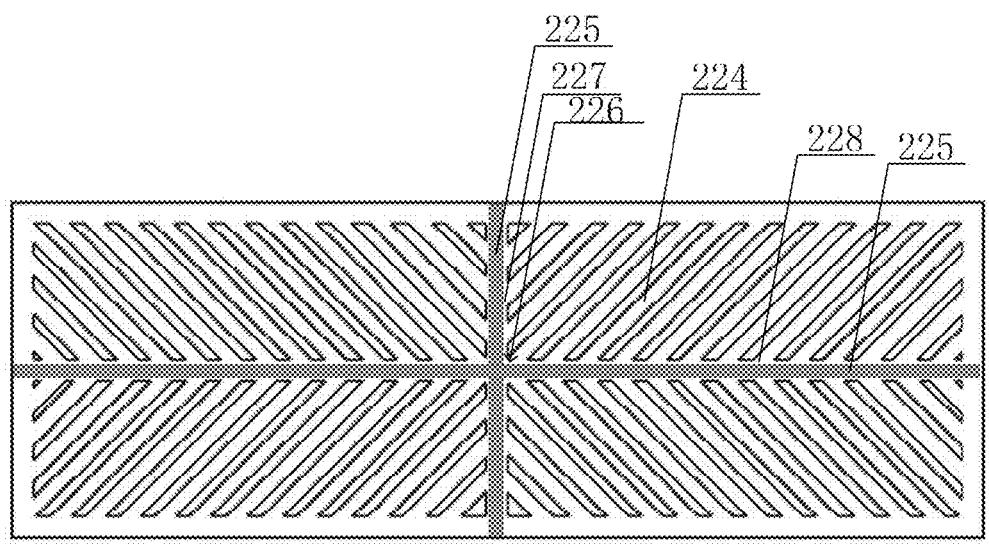
FIG. 7 is a schematic structural view of a second pixel electrode according to another embodiment of the disclosure.

A width of the first storage electrode 215 located in the first vertical domain line 217 is smaller than or equal to a width of the second storage electrode 225 located in the second vertical domain line 227, a width of the first storage electrode 215 located in the first transverse domain line 218 is smaller than or equal to a width of the second storage electrode 225 located in the second transverse domain line 228, by reasonably adjusting the width(s) of the first storage electrode 215 located in the first vertical domain line 217 and/or the first transverse domain line 218, and by reasonably adjusting the width(s) of the second storage electrode 225 located in the second vertical domain line 227 and/or the second transverse domain line 228, a capacity of the second storage capacitor 223 is larger than a capacity of the first storage capacitor 213, it can better ensure reducing a difference between charging rates of two pixels in the situation of different data signal delays, the problem of horizontal bright and dark lines is effectively improved, better display effect of the display panel is ensured, market competitiveness of the display panel is better enhanced, uneven brightness of the display panel and Mura phenomenon caused by the uneven brightness are effectively improved, and the display quality of the display panel is further increased. As exemplarily illustrated in FIG. 6 and FIG. 7, a width of the first storage electrode 215 located in the first vertical domain line 217 is smaller than a width of the second storage electrode 225 located in the second vertical domain line 227, a width of the first storage electrode 215 located in the first transverse domain line 218 is smaller than a width of the second storage electrode 225 located in the second transverse domain line 228.

Figure 8:
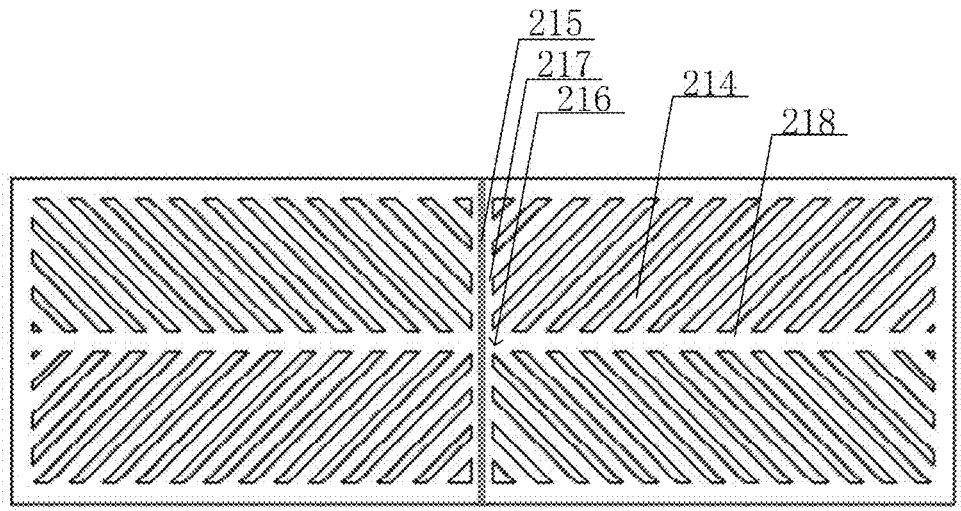
FIG. 8 is a schematic structural view of a first pixel electrode according to still another embodiment of the disclosure.
Figure 9:
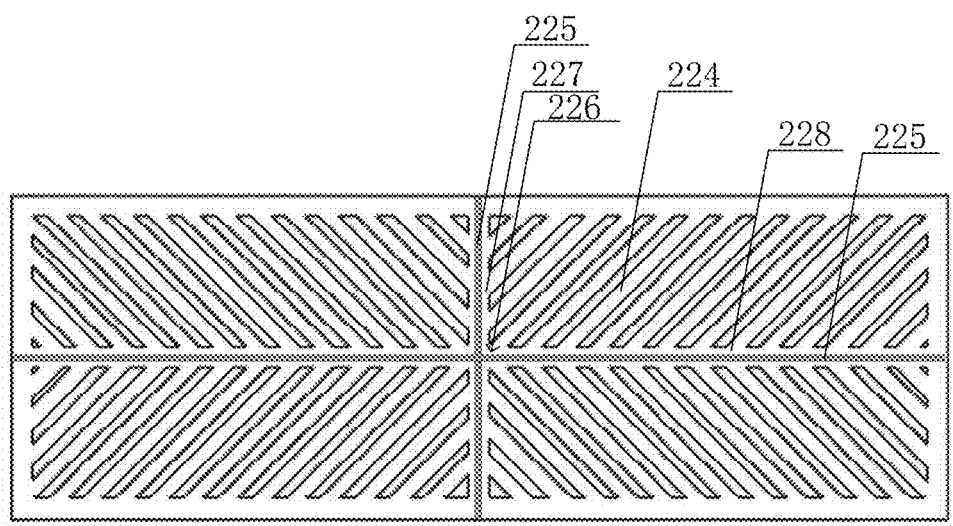
FIG. 9 is a schematic structural view of a second pixel electrode according to still another embodiment of the disclosure.

The width of the first storage electrode 215 located in the first vertical domain line 217 is smaller than or equal to the width of the second storage electrode 225 located in the second vertical domain line 227, the length of the first storage electrode 215 located in the first transverse domain line 218 is smaller than or equal to the length of the second storage electrode 225 located in the second transverse domain line 228, by reasonably adjusting the width of the first storage electrode 215 located in the first vertical domain line 217 and/or the length thereof located in the first transverse domain line 218, as well as reasonably adjusting the width of the second storage electrode 225 located in the second vertical domain line 227 and/or the length thereof located in the second transverse domain line 228, the capacity of the second storage capacitor 223 is larger than the capacity of the first storage capacitor 213, it can very effectively ensure the first storage capacitor 213 and the second capacitor 223 to achieve the same charging rate in the situation of different data signal delays, the problem of horizontal bright and dark lines is effectively improved, better display effect of the display panel is ensured, the display quality of the display panel is further increased, and the market competitiveness of the display panel is better enhanced. As exemplarily illustrated in FIG. 8 and FIG. 9, a width of the first storage electrode 215 located in the first vertical domain line 217 is equal to a width of the second storage electrode 225 located in the second vertical domain line 227, a length of the first storage electrode 215 located in the first transverse domain line 218 is smaller than a length of the second storage electrode 225 located in the second transverse domain line 228.

The widths of the first domain lines 216 and the second domain lines 226 are in the range of 3~6 μm (micrometers), by manufacturing the first domain lines 216 and the second domain lines 226 with widths in the range of 3~6 μm, it is beneficial to ensure the display effect of the display panel and can effectively reduce the sizes of dark regions presented at locations of the first domain lines 216 and the second domain lines 226 when the display panel is working, so that the display panel can achieve better display quality and the market competitiveness of the display panel is further enhanced.

The widths of the first storage electrode 215 and the second storage electrode 225 each are in the range of 3~6 μm, the widths of the first storage electrode 215 and the second storage electrode 225 are smaller than or equal to the widths of the first domain lines 216 and the second domain lines 226 respectively, when the display panel is working, liquid crystal orientations at locations of the first domain lines 216 and the second domain lines 226 are disordered, so that the locations appear dark states. The first storage electrode 215 and the second storage electrode 225 disposed right below the first domain lines 216 and the second domain lines 226 would not easy to affect the display effect of display panel and can very effectively improve the problem of horizontal bright and dark lines on the display caused by the column two-dot inversion, uneven brightness of the display panel and Mura phenomenon caused by the uneven brightness can be effectively improved, and the display quality of the display panel is further improved.

As another embodiment of the disclosure, a display apparatus including a backlight module and a display panel is provided. Regarding specific structure and connection relationship of the display panel can refer to FIG. 1 through FIG. 9, and thus will not be repeated herein.

In the above embodiments, a material of the substrate 1 may be glass, plastic and so on.

In the above embodiments, the display panel may be a liquid crystal panel, a plasma panel and so on. The liquid crystal panel is taken as an example, the liquid crystal panel includes an array substrate and a color filter (CF) substrate, the array substrate and the color filter substrate are disposed opposite to each other, the array substrate and the color filter substrate have a liquid crystal and a photo spacer (PS) disposed therebetween, the array substrate has a thin film transistor (TFT) disposed thereon, and the color filter substrate has a color filter layer disposed thereon.

In the above embodiment, the color filter substrate may include a TFT array, the color filter and the TFT array may be formed on the same substrate, the array substrate may include a color filter layer.

In the above embodiments, the display panel of the disclosure may be a curved panel.

The foregoing contents are detailed description of the disclosure in conjunction with specific preferred embodiments, and concrete embodiments of the disclosure are not limited to these description. For the person skilled in the art of the disclosure, without departing from the concept of the disclosure, simple deductions or substitutions can be made and should be included in the protection scope of the application.

What is claimed is:

1. A display panel, comprising
a substrate;
a plurality of data lines, arranged along a first direction of the substrate;
a plurality of scan lines, arranged along a second direction of the substrate;
a plurality of pixel units, wherein each of the pixel units comprising a first pixel and a second pixel;
wherein the first pixel and the second pixel are coupled to a same one of the data lines, the first pixel and the second pixel respectively are coupled to adjacent two of the scan lines, and a driving timing of the first pixel is ahead of that of the second pixel;
wherein the first pixel comprises a first capacitor, the second pixel comprises a second capacitor, the first capacitor is smaller than the second capacitor; a charging rate of the first pixel and a charging rate of the second pixel are the same; the first capacitor comprises a first pixel capacitor and at least one first storage capacitor, the second capacitor comprises a second pixel capacitor and at least one second storage capacitor, the first pixel capacitor and the second pixel capacitor are the same, the first storage capacitor is smaller than the second storage capacitor; the first pixel comprises a first pixel electrode and a first storage electrode, the second pixel comprises a second pixel electrode and a second storage electrode; the first storage capacitor is formed by the first storage electrode and the first pixel electrode matched with each other, the second storage capacitor is formed by the second storage electrode and the second pixel electrode matched with each other; an overlapped area of the first storage electrode with the first pixel electrode is smaller than an overlapped area of the second storage electrode with the second pixel electrode; a first domain line is disposed just above the first storage electrode, and the first pixel electrode comprises at least one the first domain line; a second domain line is disposed just above the second storage electrode, and the second pixel electrode comprises at least one the second domain line; an overlapped area of the first storage electrode with the first domain line is smaller than an overlapped area of the second storage electrode with the second domain line; the first pixel electrode is disposed with mutually perpendicular two first domain lines, and the two first domain lines are a first vertical domain line and a first transverse domain line; the second pixel electrode is disposed with mutually perpendicular two second domain lines, and the two second domain lines are a second vertical domain line and a second transverse domain line.

2. A display panel, comprising
a substrate;
a plurality of data lines, arranged along a first direction of the substrate;
a plurality of scan lines, arranged along a second direction of the substrate;
a plurality of pixel units, wherein each of the pixel units comprises a first pixel and a second pixel;
wherein the first pixel and the second pixel are coupled to a same one of the data lines, the first pixel and the second pixel respectively are coupled to adjacent two of the scan lines, a driving timing of the first pixel is ahead of that of the second pixel;

wherein the first pixel comprises a first capacitor, the second pixel comprises a second capacitor, and the first capacitor is smaller than the second capacitor, wherein the first capacitor comprises a first pixel capacitor and at least one first storage capacitor, the second capacitor comprises a second pixel capacitor and at least one second storage capacitor, the first pixel capacitor and the second pixel capacitor are the same, the first storage capacitor is smaller than the second storage capacitor, wherein the first pixel comprises a first pixel electrode and a first storage electrode, the second pixel comprises a second pixel electrode and a second storage electrode; the first storage capacitor is formed by the first storage electrode and the first pixel electrode matched with each other, the second storage capacitor is formed by the second storage electrode and the second pixel electrode matched with each other; an overlapped area of the first storage electrode with the first pixel electrode is smaller than an overlapped area of the second storage electrode with the second pixel electrode, wherein a first domain line is disposed right above the first storage electrode, and the first pixel electrode comprises at least one the first domain line; a second domain line is disposed right above the second storage electrode, and the second pixel electrode comprises at least one the second domain line; an overlapped area of the first storage electrode with the first domain line is smaller than an overlapped area of the second storage electrode with the second domain line.

3. The display panel as claimed in claim 2, wherein a charging rate of the first pixel and a charging rate of the second pixel are the same.

4. The display panel as claimed in claim 2, wherein the first pixel electrode is disposed with one first domain line, the second pixel electrode is disposed with one second domain line, and a width of the first storage electrode is smaller than a width of the second storage electrode.

5. The display panel as claimed in claim 2, wherein the first pixel electrode is disposed with mutually perpendicular two first domain lines, and the two first domain lines are a first vertical domain line and a first transverse domain line; the second pixel electrode is disposed with mutually perpendicular two second domain lines, and the two second domain lines are a second vertical domain line and a second transverse domain line.

6. The display panel as claimed in claim 2, wherein widths of the first domain line and the second domain line each are in a range of 3~6 μm.

7. The display panel as claimed in claim 2, wherein widths of the first storage electrode and the second storage electrode each are in a range of 3~6 μm, the widths of the first storage electrode and the second storage electrode are smaller than or equal to widths of the first domain line and the second domain line.

8. A display apparatus, the display apparatus comprising a backlight module and a display panel, the display panel comprising:
a substrate;
a plurality of data lines, arranged along a first direction of the substrate;
a plurality of scan lines, arranged along a second direction of the substrate;
a plurality of pixel units, wherein each of the pixel units comprises a first pixel and a second pixel;

wherein the first pixel and the second pixel are coupled to a same one of the data lines, the first pixel and the second pixel respectively are coupled to adjacent two of the scan lines, and a driving timing of the first pixel is ahead of that of the second pixel;

wherein the first pixel comprises a first capacitor, the second pixel comprises a second capacitor, and the first capacitor is smaller than the second capacitor, wherein the first capacitor comprises a first pixel capacitor and at least a first storage capacitor, the second capacitor comprises a second pixel capacitor and at least a second storage capacitor, the first pixel capacitor and the second pixel capacitor are the same, the first storage capacitor is smaller than the second storage capacitor, wherein the first pixel comprises a first pixel electrode and a first storage electrode, the second pixel comprises a second pixel electrode and a second storage electrode; the first storage capacitor is formed by the first storage electrode with the first pixel electrode matched with each other, the second storage capacitor is formed by the second storage electrode with the second pixel electrode matched with each other; an overlapped area of the first storage electrode with the first pixel electrode is smaller than an overlapped area of the second storage electrode with the second pixel electrode, wherein a first domain line is disposed just above the first storage electrode, and the first pixel electrode comprises at least one the first domain line; a second domain line is disposed just above the second storage electrode, and the second pixel electrode comprises at least one the second domain line; an overlapped area of the first storage electrode with the first domain line is smaller than an overlapped area of the second storage electrode with the second domain line.

9. The display apparatus as claimed in claim 8, wherein a charging rate of the first pixel and a charging rate of the second pixel are the same.

10. The display apparatus as claimed in claim 8, wherein the first pixel electrode is disposed with one first domain line, the second pixel electrode is disposed with one second domain line, and a width of the first storage electrode is smaller than a width of the second storage electrode.

11. The display apparatus as claimed in claim 8, wherein the first pixel electrode is disposed with mutually perpendicular two first domain lines, and the two first domain lines are a first vertical domain line and a first transverse domain line; the second pixel electrode is disposed with mutually perpendicular two second domain lines, and the two second domain lines are a second vertical domain line and a second transverse domain line.

12. The display apparatus as claimed in claim 8, wherein widths of the first domain line and the second domain line each are in a range of 3~6 μm.

13. The display apparatus as claimed in claim 8, wherein widths of the first storage electrode and the second storage electrode each are in a range of 3~6 μm.

14. The display apparatus as claimed in claim 8, wherein widths of the first storage electrode and the second storage electrode are smaller than or equal to widths of the first domain line and the second domain line respectively.

* * * * *